US012568168B2

(12) United States Patent
    Chandra

(10) Patent No.: US 12,568,168 B2
(45) Date of Patent: Mar. 3, 2026

(54) MALICIOUS ACTIVITY DEFENSE USING EPHEMERAL RECORD DATA

(71) Applicant: Capital One Services, LLC, McLean, VA (US)

(72) Inventor: Niharendu Chandra, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 292 days.

(21) Appl. No.: 18/511,118

(22) Filed: Nov. 16, 2023

(65) Prior Publication Data

US 2025/0168278 A1    May 22, 2025

(51) Int. Cl.
    *H04M 3/436*    (2006.01)
    *H04M 3/42*    (2006.01)

(52) U.S. Cl.
    CPC ....... *H04M 3/436* (2013.01); *H04M 3/42068* (2013.01)

(58) Field of Classification Search
    CPC .......................... H04M 3/436; H04M 3/42068
    See application file for complete search history.

(56) References Cited

U.S. PATENT DOCUMENTS

2022/0179665 A1 * 6/2022 Rathod .................. G06F 9/451

\* cited by examiner

*Primary Examiner* — Curtis B Odom
(74) *Attorney, Agent, or Firm* — Foley & Lardner LLP

(57) ABSTRACT

A method and related system for providing contextual data using ephemeral records includes operations to detect a request for communication from a first device associated with a first identifier to a second device associated with a second identifier and retrieve a profile from a database based on the first identifier in response to detecting the request. The method also includes retrieving an ephemeral record of the profile based on the second identifier, where the ephemeral record is associated with an expiration time and includes a set of context values provided via a first message associated with the second identifier. The method also includes providing a second message including the set of context values to the second device and deleting the ephemeral record at a time exceeding the expiration time where receiving the second message causes a screen of the second device to display the set of context values.

20 Claims, 3 Drawing Sheets

MALICIOUS ACTIVITY DEFENSE USING EPHEMERAL RECORD DATA

SUMMARY

The complexity of a modern communication system invites various types of malicious and fraudulent activities that attack points of weakness in this complex system. In many telecommunication systems, unauthorized agents may use public or semipublic data to mislead others about their identities or perform other fraudulent activities for malicious purposes. Many of these interactions may be mitigated by reducing the likelihood that the user-related data being used is accessible or being stored in the first place. Additionally, displaying a greater standard of contextual detail to a user during communication attempts may significantly increase the likelihood that the user will correctly determine whether to accept a communication request.

Some embodiments may overcome the technical issue described above or other issues by using ephemeral data to provide contextual information before allowing a user to accept a communication request. Some embodiments may detect a request for communication from a first communication device associated with a first identifier to a second communication device associated with a second identifier. The request for communication may include voice communications (e.g., a phone call), video communications (e.g., a video platform communication session), or a text session (e.g., a communication session over a messaging platform). Some embodiments may then retrieve a profile in a database storing multiple profiles based on the first identifier in response to detecting the request. The profile may represent the communication-initiating entity and may include a set of ephemeral records that store information of prior communications or prior interactions with users.

Some embodiments may then retrieve an ephemeral record of the profile based on the second identifier. The ephemeral record is associated with an expiration time indicating a time of ephemeral record deletion. The ephemeral record may include a set of context values provided by a prior message, where the prior message may be provided by or otherwise indicate an account associated with the second identifier. Some embodiments may then generate and provide an identification message to the second communication device based on the set of context values. The identification message may include one or more values of the set of context values. Furthermore, receiving the identification message may cause a communication acceptance screen of the second communication device to display an identity of the profile and the set of context values.

Some embodiments may later detect that a second time exceeds the expiration time. In response to determining that the expiration time has been exceeded, some embodiments may delete the ephemeral record. By using an ephemeral record to provide context values, some embodiments may avoid costly memory consumption problems with storing interaction histories. More important, some embodiments may avoid significant data breach problems by relying on ephemeral records instead of permanent records. The use of ephemeral records that are dynamically deleted can significantly mitigate the impact of a successful data breach by reducing the amount data that could be acquired.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

Figure 1:
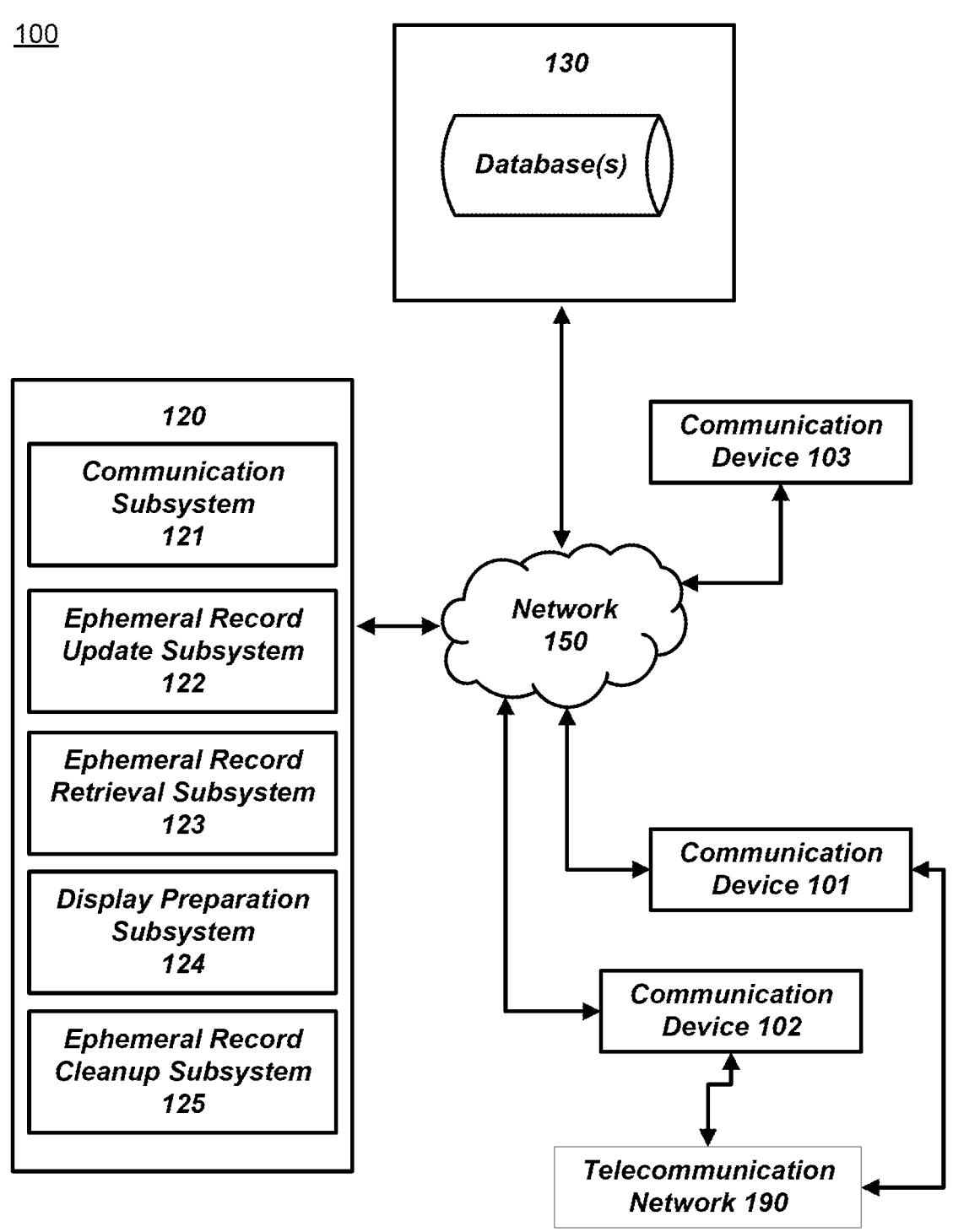
FIG. 1 illustrates an example of a system for providing context information useful to screen communication requests, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 illustrates an example of a system for providing context information useful to screen communication requests, in accordance with some embodiments. A system 100 includes a first communication device 101 and a second communication device 102. The first communication device 101 and second communication device 102 may include computing devices such as a desktop computer, a laptop computer, a wearable headset, a smartwatch, another type of mobile computing device, a transaction device, etc. In some embodiments, the first communication device 101 and a second communication device 102 may communicate with various other computing devices via a network 150, where the network 150 may include the internet, a local area network, a peer-to-peer network, etc. The first communication device 101 and second communication device 102 may send and receive messages through the network 150 to communicate with a set of servers 120, where the set of servers 120 may include a set of non-transitory storage media storing program instructions to perform one or more operations of subsystems 121-125. Furthermore, the first communication device 101 and second communication device 102 may communicate with each other via a telecommunication network 190.

While one or more operations are described herein as being performed by particular components of the system 100, those operations may be performed by other components of the system 100 in some embodiments. For example, one or more operations described in this disclosure as being performed by the set of servers 120 may instead be performed by the first communication device 101 or the second communication device 102. Furthermore, some embodiments may communicate with an application programming interface (API) of a third-party service via the network 150 to perform various operations disclosed herein. For example, some embodiments may determine a profile via an API by sending a message with an identifier of the profile to the API via the network 150.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure. For example, the set of databases 130 may store context values, ephemeral records, profile records, accounts records, machine learning model parameters, etc.

In some embodiments, a communication subsystem 121 may send or receive messages from various types of information sources or data-sending devices, including the communication devices 101-102. For example, the communication subsystem 121 may send display messages indicating context values to the first communication device 101 or the second communication device 102. Alternatively, or additionally, the communication subsystem 121 may obtain data, such as messages storing identifiers or other values described in this disclosure, from the communication devices 101-102. Furthermore, the communication subsystem 121 may send messages to the set of databases 130 based on operations described in this disclosure.

In some embodiments, an ephemeral record update subsystem 122 may generate or update one or more ephemeral records. Some embodiments may generate an ephemeral record based on a message representing interaction with the first communication device 101, where the first message may indicate an account identifier of a user account and a profile identifier indicating an entity that may seek to contact a user of the user account. Alternatively, some embodiments may generate the ephemeral record based on data provided by a third computing device, such as a computing device 103.

When generating the ephemeral record, some embodiments may generate an associated time with the ephemeral record indicating a time associated with the interaction (e.g., an ending time of the interaction). For example, the second communication device 102 may be used during an initial interaction and provide a message that includes an account identifier, a profile identifier, and an interaction ending time to the communication subsystem 121. The ephemeral record update subsystem 122 may generate an ephemeral record in a profile indicated by the message, where generating a record in a profile may include generating a record in a database and linking the record to the profile such that access to the profile enables access to the record. The ephemeral record may also include an association to an account identifier, a set of communication devices associated with the account identified by the account identifier, etc. Furthermore, the ephemeral record update subsystem 122 may set the expiration time for the ephemeral record based on the indicated time and a preset default value, where the expiration time indicates a time at which the ephemeral record is to be deleted. For example, the ephemeral record update subsystem 122 may generate an ephemeral record by first setting an expiration time of the ephemeral record to be equal to the call ending time with the addition of a preset default time.

An ephemeral record retrieval subsystem 123 may perform operations to retrieve an ephemeral record based on a detected communication request. For example, the ephemeral record retrieval subsystem 123 may detect a request for communication sent by the first communication device 101 to the second communication device 102. In some embodiments, the first communication device 101 may send a request for communication to the set of servers 120 without directly contacting the second communication device 102. For example, the first communication device 101 may send a request for communication indicating an account identifier "AC_name1" without providing a phone number. The set of servers 120 may then search one or more databases to retrieve a communication address associated with the second communication device 102, such as a phone number, messaging or voice communication platform identifier, an email, etc.

Before providing contact information, some embodiments may search a profile identified by a profile identifier associated with the first communication device 101 to determine whether the first communication device 101 is permitted to contact the second communication device 102. In some embodiments, the information indicating a permission to contact the second communication device 102 may reside in an ephemeral record stored in the profile and may be labeled as consent to contact. Alternatively, the information indicating whether the first communication device 101 has permission to contact the second communication device 102 may be stored in a field of the profile or another record of the profile. In some embodiments, the permission to contact the second communication device 102 may be implicit in the existence of an ephemeral record that stores an identifier associated with the second communication device 102. If the permission to contact the second communication device 102 is found, some embodiments may then provide a communication address to the first communication device 101 or directly connect the first communication device 101 with the second communication device 102.

Alternatively, in some embodiments, the first communication device 101 may call the second communication device 102 directly via the telecommunication network 190. The second communication device 102 may then send a message to the set of servers 120 indicating that the second communication device 102 has been contacted by the second communication device 102 with a request to communicate. The ephemeral record retrieval subsystem 123 may then search for a profile and a related ephemeral record based on the message.

The ephemeral record retrieval subsystem 123 may search the profile associated with the first communication device 101 and then search the profile based on a communication destination identifier in a communication request message provided by the first communication device 101. For example, the ephemeral record retrieval subsystem 123 may detect a communication request from the first communication device 101 via a message sent by the second communication device 102. Detecting the request may include obtaining a first phone number or messaging platform identifier associated with the first communication device 101 and a second phone number or messaging platform identifier associated with the second communication device 102. The ephemeral record retrieval subsystem 123 may search for a profile associated with the first phone number or messaging platform identifier by sending a query to the set of databases 130. After finding the profile, the ephemeral record retrieval subsystem 123 may then search for an associated ephemeral record of the profile that is associated with the second phone number or messaging platform identifier.

The display preparation subsystem 124 may generate identification information that will be sent to a communication-receiving device, such as the second communication device 102. Once the ephemeral record retrieval subsystem 123 finds an ephemeral record, the display preparation subsystem 124 may use context values stored in the ephemeral record to generate an identification message that indicates an identity (e.g., an organization name, a nickname, etc.) associated with a profile associated with the first communication device 101 and one or more context values (e.g., a nickname for a previous interaction, a meeting participant name, etc.). Once the first communication device 101 receives the identification information, the first communication device 101 may display a communication acceptance screen that presents the identity of the profile and the one or more context values. For example, the display preparation subsystem 124 may generate an identification message that includes the profile identifier "dataSource1" and the context value "GaryApprov." After receiving the identification, the second communication device 102 may then present, on a display screen, a user interface (UI) with the text "GaryApprov @dataSource1." By displaying contextual information of a past interaction, a computing device allows a user to make a more informed decision on whether a communication request is non-fraudulent in nature and defend themselves against fraudulent communication or other malicious activity.

The ephemeral record cleanup subsystem 125 may delete one or more ephemeral records. In some embodiments, the ephemeral record cleanup subsystem 125 may scan through an index of ephemeral records to determine whether an associated expiration time is exceeded. In response to a determination that the expiration time for an ephemeral record is exceeded, the ephemeral record cleanup subsystem 125 may then delete the ephemeral record.

Figure 2:
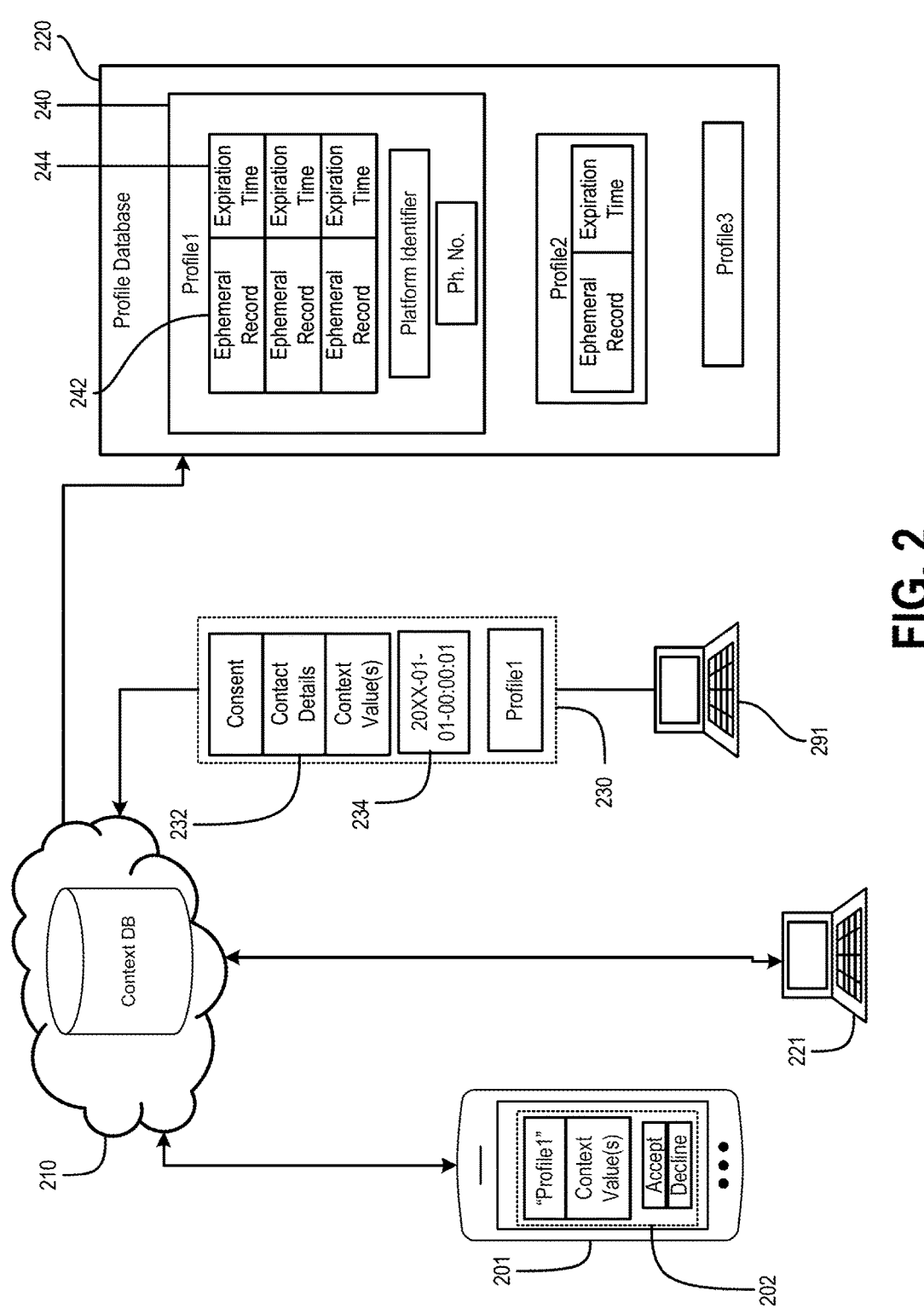
FIG. 2 illustrates an example screening system to provide context information when detecting communication requests, in accordance with some embodiments.

FIG. 2 illustrates an example screening system to provide context information when detecting communication requests, in accordance with some embodiments. During an initial interaction, some embodiments may receive a prior message 230 from a computing device 291, where the message may include a profile identifier "profile1," a set of values that may be stored as context values as shown in a prior message context values array 232, and a prior message interaction time 234. Some embodiments may use the prior message 230 to generate the ephemeral record 242 of the profile 240, where the profile 240 is stored in a profile database 220 that stores multiple profiles. Furthermore, some embodiments may use the prior message interaction time 234 to generate an expiration time 244 that indicates a deletion time for the ephemeral record 242. For example, some embodiments may add a default time, such as one day, three days, seven days, or some other duration to the prior message interaction time 234 to determine the expiration time 244. A profile of the profile database 220 may represent an entity and may store or otherwise be associated with a set of ephemeral records. A profile may be stored as a record or another data structure that may be labeled with one or more categories, such as "IT," "merchant," "dealer," etc. A profile identifier may include a string, a combination of characters, a combination of numbers, etc. For example, a profile identifier may include a phone number, a name, etc.

A cloud server 210 may detect a request to contact communication device 201 from the communication-initiating device 221. During such a contact request, the communication device 201 may act as a communication-receiving device, and the communication-initiating device 221 may act as a communication-initiating device. In response to detecting the contact request, the cloud server 210 may search through a plurality of profiles stored in a profile database 220 for a profile matching an identifier "Profile1" associated with the communication-initiating device 221 to retrieve the profile 240.

Some embodiments may search through the profile 240 to retrieve the ephemeral record 242 from a plurality of other ephemeral records. Some embodiments may then determine, based on consent data stored in the ephemeral record, that consent has been provided for the communication device 201 to be contacted. In some embodiments, the cloud server 210 may then provide a phone number in the field "contact details" stored in the ephemeral record 242 that was provided in the prior message context values array 232 to the communication-initiating device 221. Alternatively, in some embodiments, the cloud server 210 may act as a communication intermediary that enables the communication-initiating device 221 to contact the communication device 201 without providing any direct identifier of the communication device 201 to the communication-initiating device 221.

The cloud server 210 may then provide context value data to the communication device 201 from the ephemeral record 242. For example, the cloud server 210 may provide, to the communication device 201, written information originally provided by the prior message context values array 232. The communication device 201 may then display a UI screen 202. The UI screen 202 includes a profile identifier of the profile 240, the set of context values originally provided in the prior message context values array 232, and a set of interactive UI elements allowing a user to accept or decline a communication request.

The cloud server 210 may determine that a current time exceeds the expiration time 244. In response, the cloud server 210 may delete the ephemeral record 242. Upon deletion of the ephemeral record 242, all data in the ephemeral record 242 is deleted and no longer usable. By deleting the ephemeral record 242, some embodiments may reduce memory load, protect user privacy, and reduce the impact of an unauthorized data breach on user security or other malicious activity.

Figure 3:
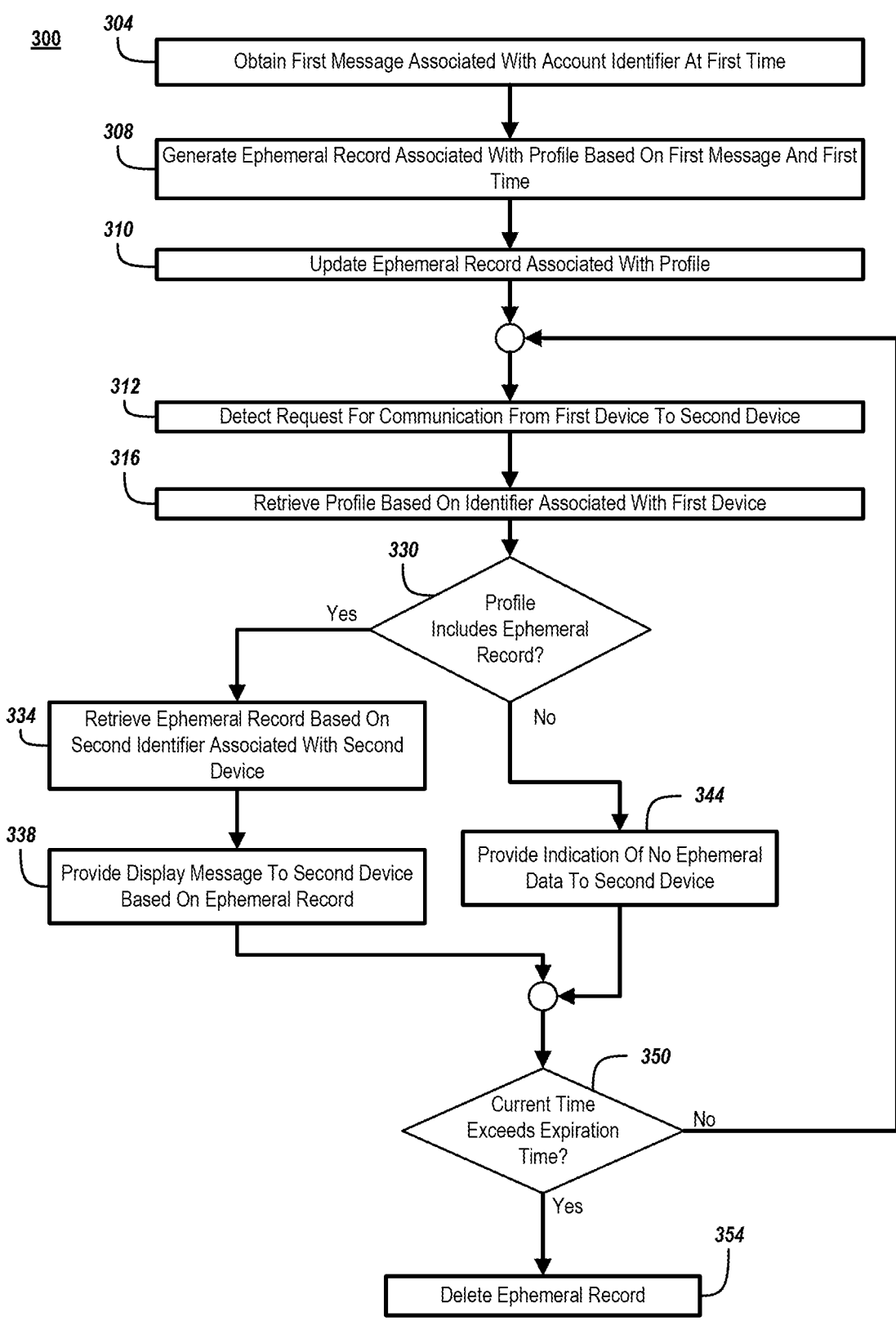
FIG. 3 is a flowchart of a process for providing context information, in accordance with one or more embodiments.

FIG. 3 is a flowchart of a process 300 for providing context information, in accordance with one or more embodiments. Some embodiments may obtain a first message associated with an account identifier at a first time, as indicated by block 304. The first message may be provided by a communication device that will later be contacted. In some embodiments, the first message may be provided in the form of a web request or response to a web request. Alternatively, the first message may be provided in an application-specific format that is interpretable by a receiving API.

The first message may include or be otherwise associated with an account identifier. The first message may be associated with an account identifier by directly including the account identifier. Alternatively, the first message may be sent in association with another identifier that may be mapped to the account identifier via a database of account records. For example, after receiving a first message, some embodiments may determine that the first message includes an intermediate identifier "123CBA" and determine that this intermediate identifier is mapped to the account identifier "AAA123" in an account database.

Some embodiments may receive a message from a computing device that will later also receive one or more communication requests. The computing device may send a message using one or more various types of operations based on one or more communication layers. For example, some embodiments may send communications via a Transmission Control Protocol/Internet Protocol (TCP/IP) direct connection or via a web service that sends and transmits data via Hypertext Transfer Protocol (HTTP) requests or responses.

Some embodiments may generate an ephemeral record associated with profile based on the first message, as indicated by block 308. An ephemeral record may include a set of context values that may be displayed or used to generate additional data that may be displayed. Furthermore, an ephemeral record may be assigned with an expiration time that indicates a time of ephemeral record deletion. In some embodiments, the set of servers 120 may delete or otherwise render unusable the ephemeral record upon a determination that the expiration time is satisfied. Some embodiments may determine the expiration time based on a first time provided by the first message or otherwise associated with the first message.

Some embodiments may use audio information from a first call when generating a display context for an ephemeral record. For example, some embodiments may obtain an audio recording representing an interaction between a user of a user account that is to be contacted or otherwise is associated with a device to be contacted. In some embodiments, the audio recording may be retrieved from at least one of the first communication device or second communication device indicated by a request for communication. Alternatively, the audio recording may be retrieved from other sources, such as a computing device that does not participate in a later communication session. Some embodiments may use a natural language model to determine one or more values of an ephemeral record. For example, some embodiments may generate a token sequence based on the audio recording by first using a set of transcription operations to generate a written text form of the audio recording and then tokenizing the audio recording using one or more tokenizing libraries of a natural language model, such as the Hugging Faces tokenizer library, the BERT tokenizer library, the natural language toolkit (NLTK) library, etc. Some embodiments may then provide the tokenized output to a prediction model to determine one or more context values that the prediction model is trained to extract. For example, some embodiments may provide a tokenized output to a prediction model to extract a name, location, time, price, numeric range, or list of categories. Some embodiments may organize this information in a data table that may then be stored in an ephemeral record and later be provided to a user before or during a later communication session.

Some embodiments may determine an expiration date based on a predicted output of a prediction model, where the predicted output may include an extracted time value. For example, some embodiments may extract the phrase, "three days from now" and, in response, set an expiration date of 72 hours (or some other configured time interval) from a time associated with the audio recording. The time associated with the audio recording may include a time in which the audio recording is indicated to have begun, a time in which the phrase "three days from now" is said, a time in which the audio recording is indicated to have ended, etc. While some embodiments may use the configured time interval of 72 hours, other time intervals are possible, such as 24 hours, seven days, one month, three months, etc.

Some embodiments may update the ephemeral record, as indicated by block 310. As discussed elsewhere in this disclosure, an ephemeral record or its associated expiration time may be modified after being created. Some embodiments may modify an ephemeral record associated with an account based on a message provided by or otherwise associated with the account, where the message directly includes an identifier of the account. Alternatively, some embodiments may be caused to modify an ephemeral record based on a relation between the ephemeral record and an updated profile of a communication-initiating entity, a modification to a user account, etc.

Some embodiments may detect a change in an ephemeral record and, in response, update other ephemeral records. Some embodiments may store different ephemeral records associated with different profiles, where each of the different profiles may share a same category or be otherwise grouped with each other. For example, some embodiments may store a first ephemeral record associated with a first account in a first profile and store a second ephemeral record associated with the first account and a second profile. Some embodiments may obtain a message to delete the ephemeral record in the first profile and, in response, delete the first ephemeral record. Based on a shared category between the first and second profiles, some embodiments may then delete the second ephemeral record. In some embodiments, the message to delete the first ephemeral record may indicate the shared category, where some embodiments may delete the first ephemeral record without deleting the second ephemeral record if the message to delete the first ephemeral record does not indicate the shared category.

Some embodiments may update an expiration data residing in ephemeral records based on a user's physical visit to a site associated with a profile or other geographical activity associated with the user. For example, some embodiments may determine that a communication device associated with a user identified in an account has visited a geographic location identified or other files associated with a profile. The geographic location may be defined as a radius of an area, a ZIP Code, a collection of GPS coordinates, etc. Some embodiments may then determine an exit time from the geographic location based on data collected from the communication device and, in response, determine an update to an expiration time of ephemeral data associated with the user based on the exit time. For example, a communication device may detect a geolocation that is within defined region associated with a profile and send a message indicating the geolocation to a server. The server may retrieve a profile associated with the location and, in response, search for one or more ephemeral records associated with the communication device or an account associated with a communication device. If such an ephemeral record is found, some embodiments may then increase the expiration time associated with the communication device from a first time to a second time based on the exit time from the geographic region (e.g., increase by 1 hour from the exit time, increase by 24 hours from the exit time, increase by 48 hours from the exit time, or an increase by some other number of hours from the exit time). For example, some embodiments may increase an expiration time for an ephemeral record by an additional 48 hours. In some embodiments, such operations may account for the possibility that a user, having visited the geographic location, would be interested in receiving follow-up communication from an entity represented by the profile.

Some embodiments may permit a communication-initiating entity to extend an expiration time of an ephemeral record associated with a user account. As described elsewhere in this disclosure, some embodiments may permit a user account associated with a communication-receiving device to control an ephemeral record. However, in some embodiments, a communication-initiating entity may modify an ephemeral record's expiration time without changing the control architecture of the ephemeral record by providing a verification code. The verification code may be used to verify an attempt to change the expiration time initialized by the account. Some embodiments may receive a verification code or other type of verification value associated with an account identifier, such as by receiving the verification value from a user while the user is logged into an account that is identified by the account identifier. The verification value may include a string of letters, numbers, symbols, or other characters, image data, or some other type of value.

Some embodiments may later receive an update message from an account identified or otherwise associated with a profile identifier. For example, an entity may update the expiration time of an ephemeral record by submitting a web request to a server that controls access to the ephemeral record while logged into an account associated with the profile, where the web request indicates a new time and includes a candidate value. Some embodiments may decrypt the candidate value and compare the decrypted candidate value with the verification value associated with the second identifier. Alternatively, some embodiments may detect a match without decrypting any verification values by comparing hashed versions of the candidate value with a hashed version of the verification value stored in association with a user account identifier. In response to a detected match between the verification value and the candidate value, some embodiments may then update the expiration time associated with an ephemeral record based on a time provided in the web request sent by the entity, where the ephemeral record is associated with the user account and is stored in the profile. For example, some embodiments may receive a time value representing a later expiration time in conjunction with a candidate value. In response to a detected match between the candidate value and the verification value, some embodiments may update an expiration time to be the later expiration time.

As described elsewhere in this disclosure, a useful aspect of some embodiments is that a user has control of their ephemeral data. In some embodiments, the user may modify values in their ephemeral records by modifying one or more values of their account. Modifying one or more values of their account may include updating expiration times associated with ephemeral data by providing a new termination time that updates multiple ephemeral records. For example, a user may access a global value of their account, where the global value sets a maximum storage time for their ephemeral data to "three days." In response to detecting this update, some embodiments may increase or decrease the maximum number of days to 72 hours for all ephemeral records. Alternatively, or additionally, some embodiments may receive a termination time from the second communication device that updates the termination time for a particular ephemeral record. For example, some embodiments may obtain a message from a receiving communication device, where the message may indicate a profile identifier and a termination time. Some embodiments may then search for an ephemeral record of the profile identified by the profile identifier that is associated with the receiving communication device (e.g., associated with an account identifier of an account which indicates the receiving communication device). After finding this ephemeral record, some embodiments may modify the expiration time to match the termination time.

Furthermore, some embodiments may update data residing in an ephemeral record based on a user's activity without modifying the deletion time associated with the ephemeral record. Some embodiments may detect an update to the account and, in response, update one or more context values of one or more ephemeral records associated with the account. For example, a user may use a computer device to update their user account to indicate that an entity associated with profile "profile1" should be assigned to the nickname "Group1." Some embodiments may then update the set of context values in an ephemeral record associated with the user account such that the ephemeral record includes the label "Group1" in response to a determination that the ephemeral record is in the profile "Profile1." Furthermore, some embodiments may add additional category values to the set of context values. For example, a user may use a computing device to update their profile to indicate that all transactions and interactions related to both the category "groceries" and the category "entertainment" should be given a new label "cags1." Some embodiments may then update the set of context values in an ephemeral record such that the ephemeral record includes the label "cags1" in response to a determination that the ephemeral record includes the category "groceries" and the category "entertainment."

Some embodiments may receive such a message indicating anomalous activity associated with a profile from a communication-receiving device or another computing system and, in response, perform downstream operations such as deleting some or all ephemeral records in the profile. For example, a cell phone may receive a communication request from a dialing communication device and be provided with a display message that indicates a context for the communication request. A user of the cell phone may later indicate that the display message was misleading and, in response, send a message indicating anomalous activity for the communication session between the cell phone and the dialing communication device, where the message may be sent as a web request or other type of request from the cell phone or a different computing device. Some embodiments may then update an anomalous activity counter based on the message provided by the cell phone, where the anomalous activity counter may be associated with a profile linked to the dialing communication device. Some embodiments may then determine whether the anomalous activity counter satisfies an anomalous activity threshold. In response to determining that the anomalous activity counter satisfies the threshold, some embodiments may flag the profile as anomalous and perform various types of operations in response. For example, some embodiments may delete the profile or suspend the profile from activities such as routing activities to permit users of the profile information to contact other users via emails, phone numbers, or messaging platform identifiers stored in the user accounts. Some embodiments may also delete a plurality of ephemeral records or other types of records stored in the profile, where the plurality of deleted ephemeral records may include an ephemeral record used to initiate the communication session that was later indicated to be anomalous. Alternatively, or additionally, a record being deleted may be unassociated with a user account that reported the profile as anomalous.

Some embodiments may receive a time-related update to ephemeral data that does not necessarily change the expiration time but does change the context being displayed.

Some embodiments may receive data that creates a schedule of different screens to display over a period of time before an expiration time is reached. For example, some embodiments may obtain a message from an account that is identified by a corresponding account identifier, such as a user account that identifies or is otherwise mapped to a communication-receiving device. The message may include a set of updated time values indicating an updated set of context values associated with the set of updated time values, where one or more values of the updated set of context values may replace an initial set of context values of an ephemeral record. For example, some embodiments may generate an initial ephemeral record with an initial context value for a field "color" of the initial ephemeral record, where the initial set of context values includes "white" for a field "color." Some embodiments may obtain a message that includes a key-value array "[T1:"green"; T2:"yellow"; T3:"red"]" and update one or more ephemeral records based on this key-value array, where the keys "T1," "T2," and "T3" of the key-value pairs may represent updated times, and where the values of the key-value pairs may represent associated context values. The set of context values used to update the ephemeral record may indicate which contact value to use based on which updated times have been exceeded. For example, some embodiments may determine that a current time exceeds the time represented by T1 without exceeding the time represented by the time T2 and, in response, select "green" as a context value to present in lieu of the original context value "white" stored in the ephemeral record. After the selection, some embodiments may then send the selected context value "red" to a communication device that received the communication request. Furthermore, some embodiments may detect a request at a time after T2 and before the time T3 and, when sending a display message to a communication device, select the context value "yellow" in lieu of "white" to send as part of the display message.

Some embodiments may detect a request for communication from a first device to a second device, as indicated by block 312. Some embodiments may serve as a communication intermediary between two communication devices and detect a request by obtaining the request directly. From example, a user may log into an account corresponding with a profile via a first communication device and use the first communication device to send a web request to a server, where the web request includes an account identifier indicating a target user to contact. The server may then select a second communication device representing a designated communication device assigned to the account identified by the account identifier. Alternatively, some embodiments may receive a request for information from a device that has already received a communication request. For example, a communication device may receive a call from a dialing device and, in response, send a web request to a server that indicates the phone number of the dialing device.

A request for communication may include an attempt to send a phone call to a phone. For example, a first communication device being used as a dialing device may be associated with a first identifier such as a phone number. A user of the first communication device may initiate a call to a cell phone representing a second device associated with a second identifier, such as the phone number of the second device. Some embodiments may then detect the call as a communication request by receiving the request from the dialing device directly or by receiving a request from the cell phone receiving the call.

Some embodiments may provide the application that is installed on the receiving device to retrieve data stored in ephemeral records and display the retrieved data. For example, some embodiments may install an application that may intercept communication requests to prevent such communication requests from being accepted before contextual information is provided about the communication requests. Some embodiments may provide an application to a mobile computing device that causes the mobile computing device to modify a set of configuration parameters (e.g., initialization values, operating system permissions, etc.) that permit the installed application to receive incoming calls. For example, some embodiments may provide an application that enables the permission "CALL_SCREENING" of a mobile computing device operating the Android OS. Some embodiments may then detect a request to contact the mobile computing device by receiving an interception message from the application operating on the mobile computing device indicating an attempt to call the mobile computing device from a dialing device. The interception message may include a number associated with the dialing device or other data provided in association with the communication attempt. As described elsewhere in this disclosure, some embodiments may then retrieve a profile associated with the number and obtain an ephemeral record associated with the mobile computing device from the profile.

Some embodiments may retrieve a profile based on an identifier associated with the first device, as indicated by block 316. In some embodiments, an identifier provided by a request for communication may be directly mapped to a profile. For example, some embodiments may access a database that indexes profiles by phone numbers. Some embodiments may then generate a query based on a phone number provided by a web request indicating a request for communication and retrieve the profile indexed by the phone number. Some embodiments may further refine this data by extensions to the phone numbers.

Some embodiments may determine whether the profile includes the ephemeral record, as indicated by block 330. A profile may store or be otherwise associated with one or more ephemeral records. Alternatively, or additionally, some profiles may store no ephemeral records.

Some embodiments may retrieve the ephemeral record based on a second identifier associated with the second device, as indicated by block 334. Some embodiments may search the ephemeral records stored in a profile or otherwise available to the profile by searching the ephemeral records based on the second identifier indicating an account or a target device for a communication attempt. For example, some embodiments may concurrently search for a profile and a particular ephemeral record of the profile by submitting a query to a database of profiles that includes a value used to index profiles, such as a dialing device phone number, and a value used to index or otherwise identify a receiving device or account associated with the receiving device, such as a target phone number.

As described elsewhere, the ephemeral record may be associated with an expiration time and a set of context values. Some embodiments may explicitly check whether the expiration time is satisfied by the current time of the ephemeral record retrieval operation. Alternatively, some embodiments may rely on a dynamic deletion operation and presume that the ephemeral record has not reached its expiration time based on a determination that the ephemeral record has been found in the profile.

Some embodiments may retrieve the set of context values that were provided directly from the first message. Alternatively, some embodiments may derive an additional set of values from the information provided in the first message and use one or more of these additional values in the set of context values to populate fields of an ephemeral record or update the ephemeral record. For example, after receiving a name and a sentence, some embodiments may perform operations to summarize the sentence and store the sentence summary in the ephemeral record.

Some embodiments may provide a display message to the second device based on the ephemeral record, as indicated by block 338. Some embodiments may send a display message to the second device that causes the second device to display information related to the set of context values stored in the ephemeral record retrieved with the first and second identifiers. For example, after retrieving an ephemeral record, some embodiments may send a web response message to a mobile communication device that causes a browser or native application of the mobile communication device to display a string representing a value stored in the set of context values of the ephemeral record.

Some embodiments may determine that a receiving communication device has an application to directly process ephemeral data. For example, some embodiments may determine, from an ephemeral record, that a receiving communication device has a recognized native application installed on the receiving communication device. Alternatively, some embodiments may receive a request from a receiving communication device, where the request is provided by the native application itself or otherwise indicates that the receiving communication device has the recognized native application installed on the receiving communication device. In response, some embodiments may route any display messages to the installed application directly by including one or more parameters indicating that the display message should be provided to an API of the installed application once the display message is received by the receiving communication device.

Some embodiments may send text or types of data to a native application executing on a mobile computing device that causes the mobile computing device to display additional information when receiving a communication request. In some embodiments, a set of servers performing operations described in this disclosure may generate layout configuration data, animation data, or other visual information defining some or all of a UI screen. Some embodiments may then send the layout configuration data or other visual information data to a receiving communication device for the receiving communication device to display on a screen. For example, some embodiments may send a set of Hyper Text Markup Language (HTML), Cascading Style Sheets (CSS), and JavaScript code indicating the size and shape of certain elements of a UI to a mobile computing device acting as a receiving communication device. After receiving the code, the communication device may then display the UI screen defined by the transmitted code. By using more advanced display information, some embodiments may provide better reminders of the context of a call interaction, such as by providing an animation, a data table, or more detailed data that helps a user receiving a call or other communication request to understand the context of the communication request.

As described elsewhere in this disclosure, some embodiments may store visual information in the ephemeral data. When sending a display message in response to a detection of a communication request to a communication-receiving device, some embodiments may retrieve visual information stored in an ephemeral record and send the visual information in the display message. For example, some embodiments may detect an instant messaging request from a first communication device to a second communication device. In response, some embodiments may search a profile associated with the first communication device to retrieve an ephemeral record associated with an account identifier that is associated with the second communication device. Some embodiments may then retrieve an image of a vehicle from the ephemeral record and send a message to the second communication device that includes the image of the vehicle. The second communication device may then display the image of the vehicle on a communication acceptance screen of the second communication device.

Some embodiments may provide an indication that no ephemeral record was found to the second device, as indicated by block 344. Some embodiments may account for communication requests from registered entities that have their own profiles but do not have an ephemeral record with a communication target. For example, some embodiments may detect a request for communication from a source phone number to a destination phone number and successfully retrieve a profile mapped to the source phone number. However, some embodiments may then determine that there is no ephemeral record associated with the destination phone number in the profile. In response, some embodiments may then generate a display message to be sent to the mobile computing device that sent the message indicating the request for communication or to the mobile computing device mapped to the destination phone number, where the display message may indicate that no ephemeral record associated with the destination phone number was found. Such an indication may simply be a blank field, where an application executing on a mobile computing device that receives this message may simply leave a portion of a display blank or may display default text for such situations, such as "no history found."

Some embodiments may determine whether the current time exceeds the expiration time, as indicated by block 350. Some embodiments may determine that, at a later time, the later time exceeds the expiration time of an ephemeral record. For example, some embodiments may determine that the ephemeral record is associated with the expiration time "20XX-01-01 00:00:01" and determine that the later time of "20XX-01-01 00:00:02" exceeds this expiration time.

Some embodiments may delete the ephemeral record, as indicated by block 354. As discussed elsewhere in this disclosure, some embodiments may directly delete an ephemeral record immediately. Alternatively, some embodiments may delete ephemeral records in a batch operation by first designating that a record should be deleted in a list of records of a queue used in a scheduled batch operation. Some embodiments may then delete the records in the list of records at the time scheduled by the scheduled batch operation.

Some embodiments may receive an update from a receiving communication device to accelerate the expiration for multiple ephemeral records. Various types of mechanisms may require the acceleration of expiration times for related ephemeral records or for all ephemeral records related to a user account. For example, a user may initiate contact with multiple vendors of the same category and select an option to reduce the number of contact attempts to the user by reducing the available time that each vendor has to contact the user if another contact attempt has already been made. Some embodiments may obtain an acceleration message indicating a time from the communication device that received a previous communication attempt from a first entity. Some embodiments may then search the database of profiles or some other collection of ephemeral records to modify the expiration times associated with other ephemeral records. For example, some embodiments may receive a message indicating that a first entity identified by a first profile has contacted a communication device, where the message may be provided by the contacted communication device. Some embodiments may then modify the expiration times associated with a plurality of ephemeral records, where each affected ephemeral record may be associated with a profile that is of the same category as the first profile.

Some embodiments may receive instructions to delete all ephemeral records associated with a user. In some embodiments, deleting one ephemeral record as a result of the expiration time for that ephemeral record being satisfied may cause additional deletions of other ephemeral records, even if the other ephemeral records are associated with other profiles. Some embodiments may be configured to delete all ephemeral records for an account indicated to receive a communication request if one ephemeral record is deleted for the account. Alternatively, some embodiments may delete ephemeral related records to a first ephemeral record that was scheduled for deletion. For example, some embodiments may determine that the expiration time for a first ephemeral record has been satisfied and delete the first ephemeral record. Some embodiments may then search a user account associated with the first ephemeral record to search for other ephemeral records labeled with a same category as the first ephemeral record and delete any other discovered ephemeral records associated with the user account. Such mechanisms may protect a user's data by minimizing the amount of extraneous ephemeral data and encouraging timely communication with the user identified by the user account.

Some embodiments may delete an ephemeral record only after receiving a communication confirmation message from a communication device indicating that a communication had been established. Various messages may be sent to indicate that a communication had been established. For example, some embodiments may receive a web request or response from a communication-receiving communication device indicating that communication had been established between a communication-sending and communication-receiving communication device. After detecting that a user had accepted the call, a communication-receiving device may send a communication confirmation message to a server API indicating that the call to the receiving communication device has been accepted using an HTTP request. In some embodiments, the request may include an identifier of the entity making the call, such as a phone number assigned to the profile of the entity making the call, a field "ConfirmCallAcceptance," and a field value "1" for the field to indicate that a call from the profile entity was accepted. Furthermore, it should be understood that a communication confirmations message may use different field names or field values to indicate that a communication has been confirmed, be formatted in other data formats, etc.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIGS. 1-2 could be used to perform one or more of the operations described in relation to FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. A method comprising: detecting a request for communication from a first communication device associated with a first identifier to a second communication device associated with a second identifier; retrieving a profile from a database based on the first identifier in response to detecting the request; retrieving, at a first time, an ephemeral record of the profile based on the second identifier; providing a second message comprising the set of context values to the second communication device; and deleting the ephemeral record at a time exceeding an expiration time.

2. A method of embodiment 1, wherein the ephemeral record is associated with the expiration time and comprises a set of context values provided via a first message associated with the second identifier.

3. A method of any of embodiments 1 to 2, wherein receiving the second message causes a screen of the second communication device to display the set of context values.

4. A method comprising: detecting a request for voice communication from a first communication device associated with a first identifier to a second communication device associated with a second identifier; retrieving a profile in a database storing multiple profiles based on the first identifier in response to detecting the request, the profile storing a set of ephemeral records; retrieving, at a first time, an ephemeral record of the profile based on the second identifier, wherein the ephemeral record is associated with an expiration time indicating a time of ephemeral record deletion and comprises a set of context values provided by a prior message indicating an account associated with the second identifier; providing an identification message comprising the set of context values to the second communication device, wherein receiving the identification message causes a communication acceptance screen of the second communication device to display an identity of the profile and the set of context values; detecting that a second time exceeds the expiration time, wherein the second time occurs after the first time; and deleting the ephemeral record in response to the detection that the second time exceeds the expiration time.

5. A method comprising: detecting a request for communication from a first communication device associated with a first identifier to a second communication device associated with a second identifier; retrieving a profile from a database based on the first identifier in response to detecting the request; retrieving, at a first time, an ephemeral record of the profile based on the second identifier, wherein the ephemeral record is associated with an expiration time indicating a time of ephemeral record deletion and comprises a set of context values provided via a first message associated with the second identifier; providing a second message comprising the set of context values to the second communication device, wherein receiving the second message causes a screen of the second communication device to display the set of context values; detecting that a second time exceeds the expiration time, wherein the second time occurs after the first time; and deleting the ephemeral record in response to the detection that the second time exceeds the expiration time.

6. The method of any of embodiments 1 to 5, further comprising: obtaining a third message indicating anomalous activity from the second communication device; updating an anomalous activity counter in response to obtaining the third message; determining a result indicating that the anomalous activity counter satisfies a threshold; and in response to determining the result indicating that the anomalous activity counter satisfies the threshold, deleting a plurality of records in the profile, wherein the plurality of records comprises the ephemeral record.

7. The method of any of embodiments 1 to 6, further comprising providing an application to the second communication device, wherein: the application causes the second communication device to modify a configuration parameter permitting the application to receive incoming calls; detecting the request comprises receiving an interception message from the application indicating a phone number; and retrieving the profile comprises detecting the first identifier.

8. The method of any of embodiments 1 to 7, further comprising: obtaining a termination time from the second communication device; and modifying the expiration time to match the termination time.

9. The method of any of embodiments 1 to 8, wherein providing the second message comprises: determining a result indicating that a first application is installed on the second communication device; and routing the second message to the first application.

10. The method of any of embodiments 1 to 9, further comprising: obtaining an audio recording retrieved from at least one of the first communication device or the second communication device; generating a token sequence based on the audio recording; determining the set of context values by providing the token sequence to a prediction model; and generating the ephemeral record based on the set of context values.

11. The method of any of embodiments 1 to 10, wherein: the ephemeral record comprises image data; and the second message comprises the image data.

12. The method of any of embodiments 1 to 11, wherein the set of context values is a first set of context values, and wherein the ephemeral record comprises an initial set of context values at a time before the first time, further comprising: obtaining an updated time indicating the set of context values in association with the second identifier; and updating the ephemeral record based on the updated time, wherein providing the second message comprises: determining a result indicating that the first time exceeds the updated time; and in response to the result, selecting the first set of context values in lieu of the initial set of context values.

13. The method of any of embodiments 1 to 12, wherein the request is a first request, and wherein the profile is a first profile, further comprising: detecting a second request for communication to the second communication device from a third device associated with a third identifier; retrieving a second profile based on the third identifier in response to detecting the second request; determining that no ephemeral record associated with the second identifier is stored in the second profile; and providing a third message comprising a string identifying the second profile and an indication that no ephemeral record associated with the second identifier is stored in the second profile.

14. The method of any of embodiments 1 to 13, wherein providing the second message comprises: determining a result indicating that a first application is installed on the second communication device; and routing the second message to the first application.

15. The method of any of embodiments 1 to 14, the operations comprising: obtaining an acceleration message indicating a time from the second communication device; and searching the database to update a plurality of ephemeral records to modify the respective expiration times associated with the plurality of ephemeral records.

16. The method of any of embodiments 1 to 15, the operations comprising obtaining, from the second communication device, a communication confirmation message indicating the first identifier of the profile, wherein deleting the ephemeral record comprises deleting the ephemeral record in response to obtaining the communication confirmation message.

17. The method of any of embodiments 1 to 16, and wherein the profile is a first profile, the operations further comprising: determining that the second communication device is within a geographic location associated with the first profile; determining an exit time from the geographic location in response to the determination that the second communication device is within the geographic location associated with the first profile; and extending the expiration time based on the exit time.

18. The method of any of embodiments 1 to 17, and wherein the profile is a first profile, the operations further comprising: detecting an update to an account associated with the second identifier; and updating the set of context values of the ephemeral record based on the update to the account.

19. The method of any of embodiments 1 to 18, the operations further comprising: obtaining a verification value associated with the second identifier; receiving an update message comprising a candidate value from an account associated with the first identifier; and updating the expiration time to a later expiration time based on a detected match between the verification value and the candidate value.

20. The method of any of embodiments 1 to 19, wherein deleting the ephemeral record comprises deleting a plurality of ephemeral records associated with a plurality of profiles of the database.

21. The method of any of embodiments 1 to 20, wherein the second message comprises a layout configuration for a user interface screen that causes an application installed on the second communication device to activate and display the user interface screen.

22. The method of any of embodiments 1 to 21, the operations further comprising: obtaining an audio recording retrieved from at least one of the first communication device or the second communication device; generating a token sequence based on the audio recording; determining an extracted time value based on the token sequence by providing the token sequence to a natural language model; and generating the ephemeral record by determining the expiration time based on the extracted time value.

23. One or more tangible, non-transitory, machine-readable media storing instructions that, when executed by a set of processors, cause the set of processors to effectuate operations comprising those of any of embodiments 1 to 22.

24. A system comprising: a set of processors and a set of media storing computer program instructions that, when executed by the set of processors, cause the set of processors to effectuate operations comprising those of any of embodiments 1 to 22.

What is claimed is:

1. A system for providing an ephemeral-data-based communication screen for screening voice communications, the system comprising one or more processors programmed with instructions that, when executed by the one or more processors, cause operations comprising:

detecting a request for voice communication from a first communication device associated with a first identifier to a second communication device associated with a second identifier;

retrieving a profile in a database storing multiple profiles based on the first identifier in response to detecting the request, the profile storing a set of ephemeral records;

retrieving, at a first time, an ephemeral record of the profile based on the second identifier, wherein the ephemeral record is associated with an expiration time indicating a time of ephemeral record deletion and comprises a set of context values provided by a prior message indicating an account associated with the second identifier;

providing an identification message comprising the set of context values to the second communication device, wherein receiving the identification message causes a communication acceptance screen of the second communication device to display an identity of the profile and the set of context values;

detecting that a second time exceeds the expiration time, wherein the second time occurs after the first time; and deleting the ephemeral record in response to the detection that the second time exceeds the expiration time.

2. A method comprising:

detecting a request for communication from a first communication device associated with a first identifier to a second communication device associated with a second identifier;

retrieving a profile from a database based on the first identifier in response to detecting the request;

retrieving, at a first time, an ephemeral record of the profile based on the second identifier, wherein the ephemeral record is associated with an expiration time indicating a time of ephemeral record deletion and comprises a set of context values provided via a first message associated with the second identifier;

providing a second message comprising the set of context values to the second communication device, wherein receiving the second message causes a screen of the second communication device to display the set of context values;

detecting that a second time exceeds the expiration time, wherein the second time occurs after the first time; and deleting the ephemeral record in response to the detection that the second time exceeds the expiration time.

3. The method of claim 2, further comprising:

obtaining a third message indicating anomalous activity from the second communication device;

updating an anomalous activity counter in response to obtaining the third message;

determining a result indicating that the anomalous activity counter satisfies a threshold; and in response to determining the result indicating that the anomalous activity counter satisfies the threshold, deleting a plurality of records in the profile, wherein the plurality of records comprises the ephemeral record.

4. The method of claim 2, further comprising providing an application to the second communication device, wherein:

the application causes the second communication device to modify a configuration parameter permitting the application to receive incoming calls;

detecting the request comprises receiving an interception message from the application indicating a phone number; and retrieving the profile comprises detecting the first identifier.

5. The method of claim 2, further comprising:

obtaining a termination time from the second communication device; and modifying the expiration time to match the termination time.

6. The method of claim 2, wherein providing the second message comprises:

determining a result indicating that a first application is installed on the second communication device; and routing the second message to the first application.

7. The method of claim 2, further comprising:

obtaining an audio recording retrieved from at least one of the first communication device or the second communication device;

generating a token sequence based on the audio recording;

determining the set of context values by providing the token sequence to a prediction model; and generating the ephemeral record based on the set of context values.

8. The method of claim 2, wherein:

the ephemeral record comprises image data; and the second message comprises the image data.

9. The method of claim 2, wherein the set of context values is a first set of context values, and wherein the ephemeral record comprises an initial set of context values at a time before the first time, further comprising:

obtaining an updated time indicating the set of context values in association with the second identifier; and updating the ephemeral record based on the updated time, wherein providing the second message comprises:

determining a result indicating that the first time exceeds the updated time; and in response to the result, selecting the first set of context values in lieu of the initial set of context values.

10. The method of claim 2, wherein the request is a first request, and wherein the profile is a first profile, further comprising:

detecting a second request for communication to the second communication device from a third device associated with a third identifier;

retrieving a second profile based on the third identifier in response to detecting the second request;

determining that no ephemeral record associated with the second identifier is stored in the second profile; and providing a third message comprising a string identifying the second profile and an indication that no ephemeral record associated with the second identifier is stored in the second profile.

11. One or more non-transitory, machine-readable media storing program instructions that, when executed by one or more processors, cause the one or more processors to perform operations comprising:

detecting a request for communication from a first communication device associated with a first identifier to a second communication device associated with a second identifier;

retrieving a profile from a database based on the first identifier in response to detecting the request;

retrieving, at a first time, an ephemeral record of the profile based on the second identifier, wherein the ephemeral record is associated with an expiration time and comprises a set of context values provided via a first message associated with the second identifier;

providing a second message comprising the set of context values to the second communication device, wherein receiving the second message causes a screen of the second communication device to display the set of context values; and deleting the ephemeral record at a time exceeding the expiration time.

12. The one or more machine-readable media of claim 11, wherein providing the second message comprises:

determining a result indicating that a first application is installed on the second communication device; and routing the second message to the first application.

13. The one or more machine-readable media of claim 11, the operations comprising:

obtaining an acceleration message indicating a time from the second communication device; and searching the database to update a plurality of ephemeral records to modify the respective expiration times associated with the plurality of ephemeral records.

14. The one or more machine-readable media of claim 11, the operations comprising obtaining, from the second communication device, a communication confirmation message indicating the first identifier of the profile, wherein deleting the ephemeral record comprises deleting the ephemeral record in response to obtaining the communication confirmation message.

15. The one or more machine-readable media of claim 11, and wherein the profile is a first profile, the operations further comprising:

determining that the second communication device is within a geographic location associated with the first profile;

determining an exit time from the geographic location in response to the determination that the second communication device is within the geographic location associated with the first profile; and extending the expiration time based on the exit time.

16. The one or more machine-readable media of claim 11, and wherein the profile is a first profile, the operations further comprising:

detecting an update to an account associated with the second identifier; and updating the set of context values of the ephemeral record based on the update to the account.

17. The one or more machine-readable media of claim 11, the operations further comprising:

obtaining a verification value associated with the second identifier;

receiving an update message comprising a candidate value from an account associated with the first identifier; and updating the expiration time to a later expiration time based on a detected match between the verification value and the candidate value.

18. The one or more machine-readable media of claim 11, wherein deleting the ephemeral record comprises deleting a plurality of ephemeral records associated with a plurality of profiles of the database.

19. The one or more machine-readable media of claim 11, wherein the second message comprises a layout configuration for a user interface screen that causes an application installed on the second communication device to activate and display the user interface screen.

20. The one or more machine-readable media of claim 11, the operations further comprising:

obtaining an audio recording retrieved from at least one of the first communication device or the second communication device;

generating a token sequence based on the audio recording;

determining an extracted time value based on the token sequence by providing the token sequence to a natural language model; and generating the ephemeral record by determining the expiration time based on the extracted time value.

\* \* \* \* \*